March 4, 1969  H. SPODIG  3,430,752
CONVEYOR FOR MAGNETIZABLE COMMODITIES
Filed March 27, 1967  Sheet 3 of 3
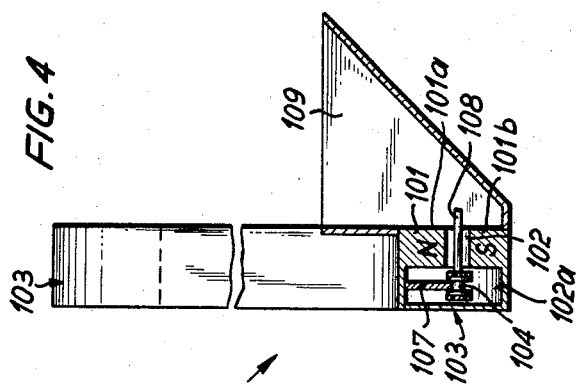
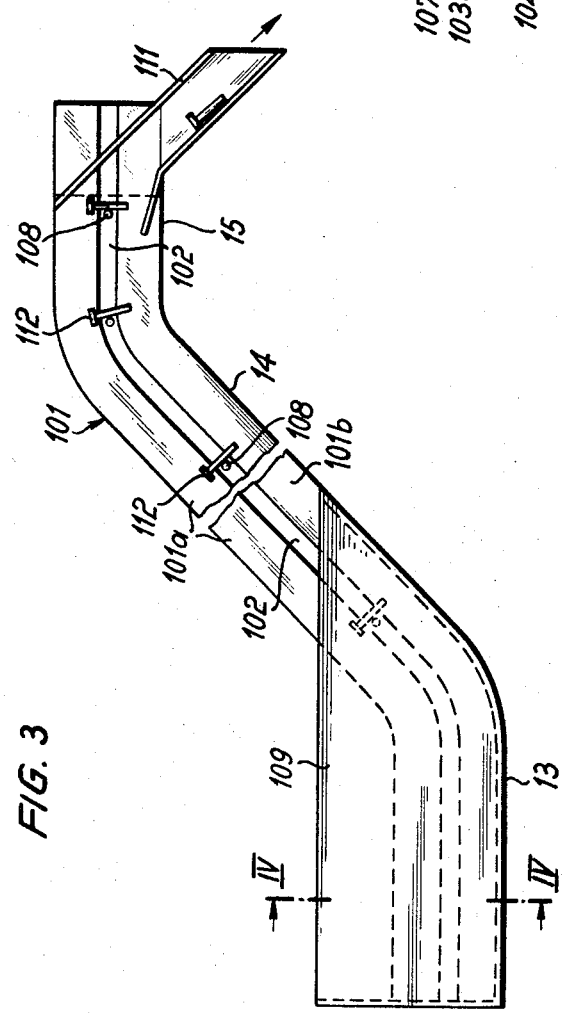
INVENTOR:
HEINRICH SPODIG
BY Michael S. Striker,
his ATTORNEY

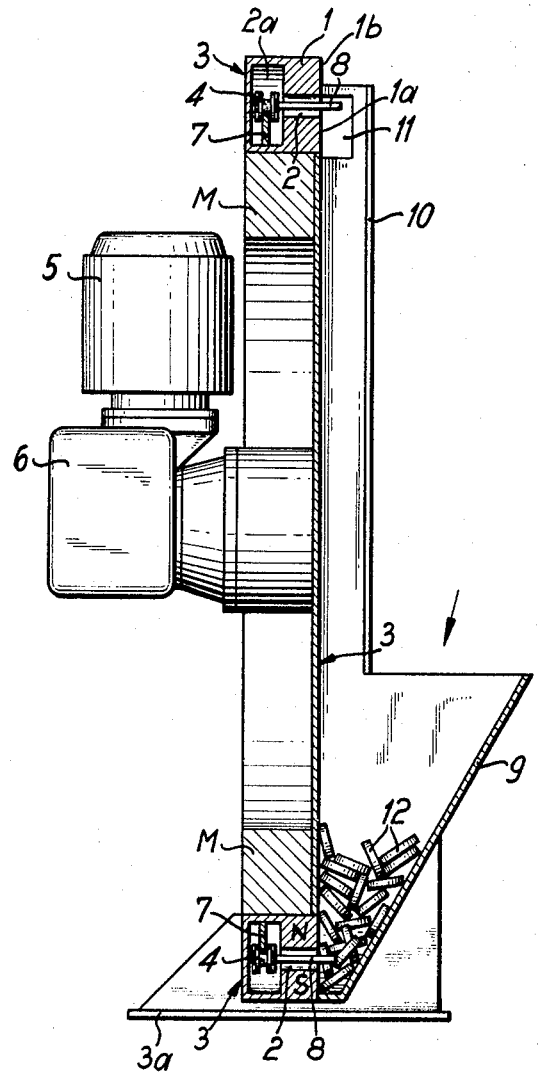

United States Patent Office 3,430,752
Patented Mar. 4, 1969

3,430,752
CONVEYOR FOR MAGNETIZABLE COMMODITIES
Heinrich Spodig, 84 Netteberge, 4711 Bork, Germany
Filed Mar. 27, 1967, Ser. No. 626,232
Claims priority, application Germany, Mar. 28, 1966,
S 102,808
U.S. Cl. 198—41          12 Claims
Int. Cl. B65g 47/12, 47/92, 47/24

ABSTRACT OF THE DISCLOSURE

A magnetic conveyor wherein the poles of a stationary magnetic rail are separated from each other by an elongated gap which receives motion transmitting pins affixed to a link chain. Magnetizable articles adhere to the two poles and extend across the gap so that, when the chain is driven, the pins cause the articles to travel along the exposed surfaces of the poles while such articles adhere to the rail. The rail may resemble an annulus or it may comprise two or more mutually inclined sections.

Background of the invention

The present invention relates to conveyors for ferromagnetic blanks or other types of magnetizable commodities. More particularly, the invention relates to improvements in magnetic conveyors wherein the magnet or magnets are stationary and serve to maintain magnetizable articles in a predetermined path.

It is already known to provide an endless chain with one or more rows of magnets which can attract magnetizable articles and then cause the thus attracted articles to participate in movements of the chain. It is also known to place stationary magnets adjacent to one side of a travelling belt and to place articles onto the other side of the belt whereby the articles adhere to the belt and share its lengthwise movement by being attracted to the magnets. My conveyor constitutes an improvement in and a further development of magnetic conveyors with stationary magnets.

It is an important object of the present invention to provide a magnetic conveyor which occupies little room, which can be utilized for simple transfer of articles between two spaced locations, for feeding of one or more rows of articles to a processing or consuming machine, and/or as a means for segregating or classifying magnetizable articles from diamagnetic or magnetizable articles.

Another object of the invention is to provide a conveyor which can transport magnetizable articles from a higher level to a lower level or vice versa, in a circular or straight path and/or in a path which is a partially straight and partially circular or otherwise curved path.

A further object of my invention is to provide a conveyor which can be converted for feeding, advancing and/or classifying of differently dimensioned and/or configurated articles.

An additional object of the invention is to provide a magnetic conveyor which can advance articles in several directions, from which the conveyed articles can be removed or separated at two or more levels or at two or more points of the path in which the articles travel, and wherein the transfer of articles can be observed at all times.

Summary of the invention

My invention resides in the provision of a conveyor which, in its elementary form, comprises stationary magnetic guide means having two elongated poles provided with adjacent exposed surfaces and separated from each other by an elongated gap which is preferably of constant width, and article advancing means including a plurality of motion transmitting members arranged to travel lengthwise of the gap and to thereby transport along the two exposed surfaces magnetizable articles which adhere to the poles and extend across the aforementioned gap. The motion transmitting members preferably extend through the gap and beyond the exposed surfaces of the guide means. The guide means may be constituted by a circular rail or by a rail which comprises a series of two or more mutually inclined sections. Suitable magnets are placed adjacent to the rail to magnetize the latter and to insure that the articles will adhere thereto during travel with the motion transmitting members.

The motion transmitting members may draw magnetizable articles from a magazine or another suitable source which is adjacent to a first portion of the gap, and such members can deliver articles seriatim to a chute or analogous article receiving means placed adjacent to another portion of the gap at the exposed surfaces of the rail. A stationary stripping or intercepting device may be used to separate from the rail such articles which are not in registry with the corresponding motion transmitting members.

The novel features which are considered as characteristic of the invention are set forth in particular in the appended claims. The improved conveyor itself, however, both as to its construction and its mode of operation, together with additional features and advantages thereof, will be best understood upon perusal of the following detailed description of certain specific embodiments with reference to the accompanying drawing.

Brief description of the drawing

FIG. 2 is an axial section as seen in the direction of arrows from the line II—II of FIG. 1;

FIG. 3 is a front elevational view of a modified conveyor wherein the guide means comprises a rail having a plurality of mutually inclined sections; and FIG. 4 is a transverse vertical section as seen in the direction of arrows from the line IV—IV of FIG. 3.

Description of the preferred embodiments

Figure 1:
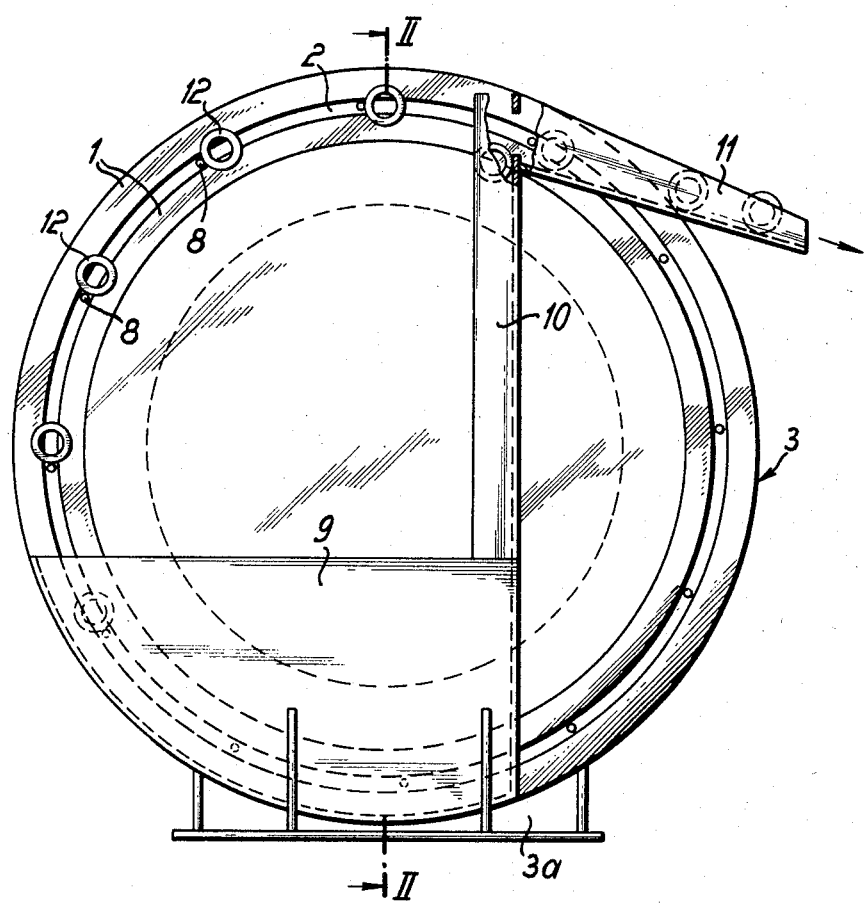
FIG. 1 is a front elevational view of a conveyor which embodies one form of my invention and wherein the guide means is constituted by a ring-shaped rail located in a vertical plane.

Referring first to FIGS. 1 and 2, there is shown a magnetic conveyor which can be utilized to feed or transport semifinished articles, such as rings 12 consisting of ferromagnetic material. The conveyor comprises stationary guide means constituted by a ring-shaped rail 1 having two concentric annular poles N, S provided with coplanar exposed surfaces 1a, 1b. The two poles are separated from each other by an annular gap 2 which communicates with an annular chamber 2a provided in a stationary ring-shaped housing or casing 3 mounted on a base 3a and including the rail 1. Suitable magnets M are provided in and/or around the casing 3 to magnetize the rail 1 so that the latter's magnetic field is strong enough to attract the articles 12 to the exposed surfaces 1a, 1b whereby such articles bridge the gap 2. The casing 3 is mounted in a vertical or nearly vertical plane and its chamber 2a accommodates advancing means including an endless flexible element 4 which is preferably constituted by a link chain. This chain is trained around supporting elements 7 which are fixed to the casing 3 and is operated by a drive means including a prime mover 5 and a suitable transmission 6. The exact manner in which a sprocket, receiving motion from the output shaft of the transmission 6, drives the chain 4 is not shown in the drawings. The prime mover 5 may be constituted by an electric motor.

The aforementioned advancing means further comprises motion transmitting members 8 which are affixed to the chain 4 and extend through the gap 2 and beyond the exposed surfaces 1a, 1b of the rail 1. In the embodiment of FIGS. 1 and 2, the motion transmitting members 8 are elongated pins or studs which are preferably provided with threads to mesh with tapped portions of the chain 4. In this way, the operators may rapidly convert the conveyor for feeding of different types or sizes of articles. For example, the pins 8 may be replaced by motion transmitting members with flattened heads which are adjacent to the exposed surfaces 1a, 1b or by otherwise configurated motion transmitting members.

A magazine 9 constitutes a source of magnetizable articles 12 and is attached to the casing 3 in a region adjacent to the lowermost portion of the gap 2. The free end portions of the pins 8 travel through the magazine 9 and each thereof entrains an article 12 by causing such article to slide along the exposed surfaces 1a, 1b and to be ultimately transferred into a stationary article receiving chute 11 which advances the articles to a machine tool or to another machine where the articles are inspected, milled, ground, turned, lapped or otherwise processed in a manner not forming part of the present invention. The inlet of the chute 11 is adjacent to the uppermost portion of the gap 2 and is positioned in such a way that receives a single file of articles 12 in response to clockwise advance of the pins 8, as viewed in FIG. 1.

A stationary stripping or intercepting device 10 is connected to the magazine 9 or to the base 3a and extends close to the inlet of the chute 11 to separate from the exposed surfaces 1a, 1b all such articles 12 which are not in exact registry with the respective pins 8. The main function of the intercepting device 10 is to insure that the inlet of the chute 11 will receive only one article at a time.

The operation of the conveyor will be readily understood, the rail 1 is magnetized and its poles attract articles 12 in the magazine 9. When the motor 5 is started, the transmission 6 drives the chain 4 whereby the end portions of the pins 8 travel in a clockwise direction, as viewed in FIG. 1, and entrain articles 12 along the exposed surfaces 1a, 1b. The articles extend across the gap 2 and, if properly aligned with the corresponding pins 8, each such article is compelled to enter the chute 11. All other articles are stripped off the surfaces 1a, 1b by the upper portion of the intercepting device 10 and descend back into the magazine 9. The magazine 9 may be configurated in such a way that the pins 8 will advance articles from a lower level to a higher level in response to clockwise or anticlockwise travel in the gap 2.

FIGS. 3 and 4 illustrate a modified conveyor wherein the guide means 101 is constituted by an elongated rail having a series of mutually inclined elongated sections 13, 14, 15. The sections 13, 15 are horizontal but are disposed at different levels and the section 14 is inclined upwardly. The poles N, S of the rail 101 have exposed surfaces 101a, 101b which attract articles 112 accommodated in a magazine 109. The articles 112 are shown in the form of bolts, spindles or unfinished gear blanks. The magazine 109 is adjacent to the lower section 13 and the motion transmitting members or spins 108 of an endless chain 104 advance the articles 112 along the exposed surfaces 101a, 101b and into the inlet of a downwardly inclined article receiving chute 111 which can convey articles by gravity feed. The end portions of the pins 108 again extend beyond the exposed surfaces 101a, 101b.

The rail 101 forms part of a casing 103 whose chamber 102a accommodates a portion of the chain 104 and the supporting elements 107. The pins 108 are separable from the chain 104 so that the conveyor of FIGS. 3 and 4 may be used for transfer, feeding or transport of different types of magnetizable commodities. Also, each of the two illustrated conveyors may be utilized for classification of magnetizable articles. For example, and assuming that the magazine 9 or 109 accommodates a mixture of magnetizable and diamagnetic articles, the pins 8 or 108 will segregate from such mixture all magnetizable articles so that the magazine will ultimately contain only diamagnetic material. Also, the conveyor may be used for segregation of relatively small magnetizable articles from relatively large magnetizable articles. Thus, and if the magazine 9 or 109 contains articles 12 or 112 in admixture with relatively heavy magnetizable articles which cannot be attracted by the two poles of the rail 1 or 101 with a force sufficing to insure that such articles will adhere to the surfaces 1a, 1b or 101a, 101b when the articles can descend by gravity, the pins 8 or 108 will entrain only the lighter articles. These pins preferably consist of diamagnetic material. It was found that pin-shaped motion transmitting members are particularly suited for transfer of differently configurated and/or dimensioned articles. The end portions of such pins can actually enter ring-shaped articles (see the articles 12 in FIGS. 1 and 2) and then insure that the articles are led straight into the inlet of the chute.

Of course, my conveyor is susceptible of many additional modifications without departing from the spirit of the present invention. For example, the advancing means including the chain 4 or 104 may be provided adjacent to the exposed surfaces 1a, 1b or 101a, 101b so that its pins 8 or 108 extend in a direction to the left, as viewed in FIG. 2 or 4. Furthermore, the pins 8 or 108 need not extend from the gap 2 or 102 if the configuration of articles is such that, while adhering to the two poles of the rail 1 or 101, a portion of an article actually extends into the gap 2 or 102. It is equally clear that the configuration of the rail 1 or 101 may be altered in a number of ways. For example, the rail 1 may be of oval shape or C-shaped and the rail 101 may include two, four or more mutually inclined sections which may but need not be straight.

Though the advancing means may include an endless belt or band, it was found that a chain is more practical, at least for certain applications of my conveyor, because the pulleys for a belt or band would have to be recessed into the rail 1 or 101 and would interrupt the magnetic field. Furthermore, a chain normally occupies less room than a belt and its pulleys, and the chain can stand greater wear.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. A conveyor, comprising vertically arranged at least partly circular magnetic guide means having two elongated poles and an elongated gap intermediate said poles, said poles having adjacent but spaced exposed surfaces located at opposite sides of said gap in a common vertical plane and being adapted to attract magnetizable articles so that the same bridge said gap; and advancing means including a plurality of elongated motion-transmitting members projecting through said gap and outwardly beyond said surfaces in substantially horizontal direction, said motion-transmitting members being arranged to travel with reference to said guide means in direction lengthwise of said gap to thereby engage and slidingly transport in an at least partly circular path and in a vertical plane articles which magnetically adhere to said surfaces and bridge said gap.

2. A conveyor as defined in claim 1, wherein said guide means is constituted by a rail forming part of a casing for said advancing means.

3. A conveyor as defined in claim 2, wherein said casing is provided with a chamber which communicates with said gap, said advancing means further comprising an endless flexible element at least a portion of which is accommodated in said chamber and said motion transmitting members being affixed to said flexible element.

4. A conveyor as defined in claim 3, wherein said flexible element is a chain.

5. A conveyor as defined in claim 1, wherein said poles are constituted by two concentric rings.

6. A conveyor as defined in claim 1, wherein each of said poles includes a series of mutually inclined elongated sections.

7. A conveyor as defined in claim 1, further comprising a source of magnetizable articles adjacent to a first portion of said guide means and article intercepting means adjacent to a second portion of said guide means, said motion transmitting members being arranged to advance articles from said source toward said intercepting means.

8. A conveyor as defined in claim 7, wherein said source is constituted by a magazine and wherein said intercepting means comprises a stationary stripping device arranged to separate from said surfaces articles which are out of registry with the respective motion transmitting members.

9. A conveyor as defined in claim 1, further comprising article receiving means adjacent to said exposed surfaces, said motion transmitting members being arranged to advance articles seriatim from a source to said receiving means.

10. A conveyor as defined in claim 1, wherein said advancing means further comprises an endless flexible element and drive means for said flexible element, said motion transmitting members being carried by and being separable from said flexible element.

11. A conveyor as defined in claim 1, wherein said motion transmitting members are pins.

12. A conveyor as defined in claim 1, wherein said motion transmitting members are arranged to advance articles between different levels.

References Cited

UNITED STATES PATENTS

| | | | |
|---|---|---|---|
| 2,722,406 | 11/1955 | Kurek | 198—41 X |
| 2,731,133 | 1/1956 | Socke | 198—41 |
| 3,168,949 | 2/1965 | Aidlin | 198—30 |
| 3,272,313 | 9/1966 | Sarovich | 198—41 |
| 3,338,374 | 8/1967 | Dudley | 198—41 |

EDWARD A. SROKA, *Primary Examiner.*

U.S. Cl. X.R.

198—33; 221—212